United States Patent
Burkhardt

[11] 3,737,204
[45] June 5, 1973

[54] EXTENDED LIFE BEARING
[75] Inventor: Edward A. Burkhardt, Indianapolis, Ind.
[73] Assignee: FMC Corporation, San Jose, Calif.
[22] Filed: Nov. 30, 1971
[21] Appl. No.: 203,149

[52] U.S. Cl. .............................. 308/241, 29/149.4 R
[51] Int. Cl. ............................................. F16c 33/30
[58] Field of Search ........................... 308/241, 193

[56] References Cited
UNITED STATES PATENTS
3,117,041  1/1964  Koistinen ........................... 308/241

Primary Examiner—Charles J. Myhre
Assistant Examiner—Frank Susko
Attorney—F. W. Anderson and C. E. Tripp

[57] ABSTRACT

An extended life roller bearing having an outer race and rollers made of through-hardening steel such as AISI 52100, and an inner race of a carburizing grade of steel that is vacuum remelted, carburized, heated into the austenitizing range and quenched to convert austenite into martensite. The inner race is then subjected to a deep freeze treatment. The inner race is then tempered to produce a one to two point Rockwell Scale C hardness differential from the rollers. After the races are finished, they are subjected to a further stress-relieving process to remove surface stresses during which a black oxide coating is applied to the inner race to protect its roller engaging surface during initial mating and operation of the bearing.

12 Claims, 2 Drawing Figures

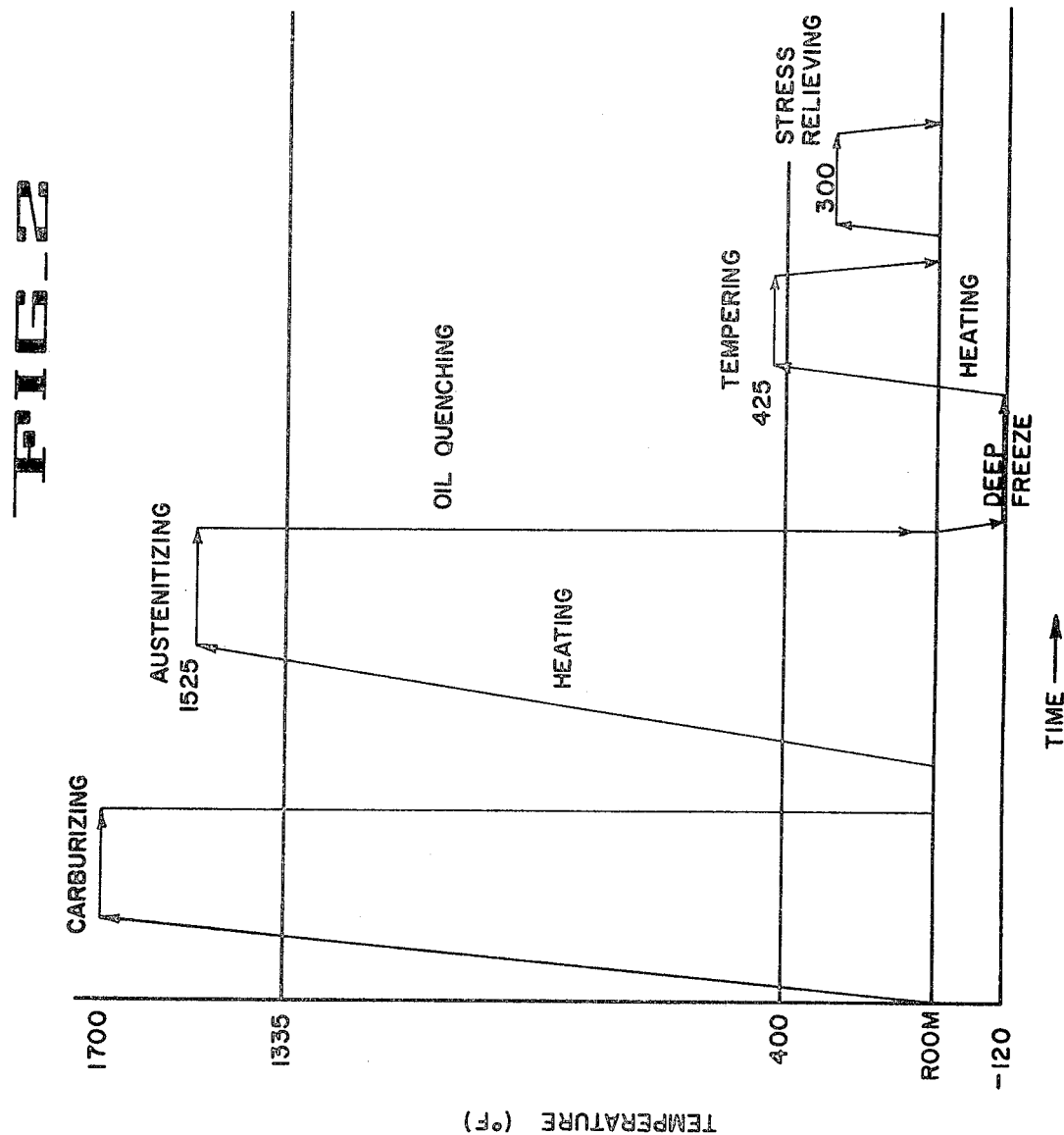
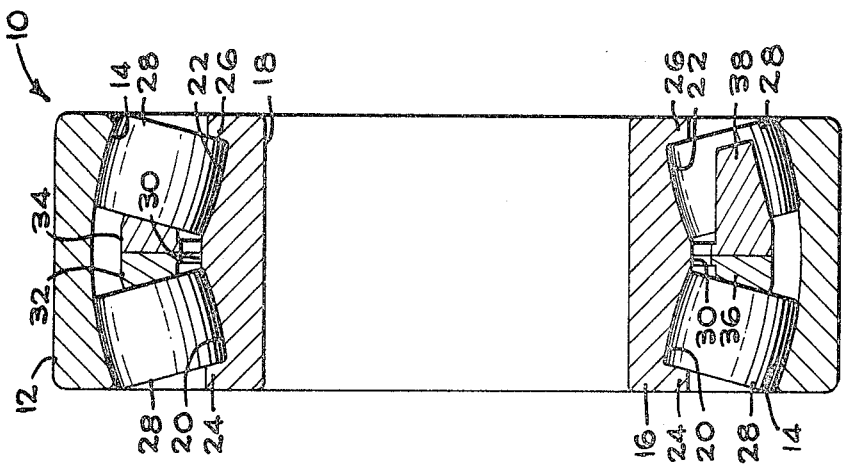

EXTENDED LIFE BEARING

BACKGROUND OF THE INVENTION

1. Field of the Invention

The present invention relates to anti-friction bearings of the ball and roller type intended for heavy duty use and more particularly to the composition and metallurgical processes for producing inner bearing races therefor to produce a bearing of significantly longer life without a proportionate increase in cost.

2. Description of the Prior Art

In general, bearings are grouped into four classifications: light, medium, or heavy duty, and premium. Light duty bearings are usually required for moderate load applications where the lubrication, vibration and other operating parameters are conducive to long life. Medium duty bearings are employed for higher loads in applications with less than ideal operating parameters that still permit adequate life. Heavy duty bearings are required in those applications where such heavy loads, in combination with one or more less than ideal operating parameters, such as impact load, excessive vibration, or poor lubrication, are too severe for medium duty bearings. Heavy duty bearings are also employed in those applications suitable for medium duty bearings where industry desires the higher reliability for extended life of the heavy duty bearing.

Premium bearings are precision bearings designed for special applications such as high temperature, corrosive atmosphere etc. and their cost is substantially greater. The basic differences between non-precision and/or between light, medium and heavy duty bearings, are in the quality of the bearing materials, the heat treatment, and the precision of the finishing operation. Heavy duty bearings are presently produced with stainless steel or through hardening steel components such as AISI 52100. As evidenced by the U. S. Pat. No. 2,400,842 issued to Schaufus, the stainless steel is heated to 1,800°F, quenched in air and then subjected to a deep freeze at −110°F. Clarke, in the U. S. Pat. Nos. 2,482,097 and 2,482,098, employs a stainless steel which is heated to 1,800°F, quenched, and then machined. Thereafter the machined part is reheated to 1,400°F and cooled. The machined part is subjected to a deep freeze at approximately −100°F or alternately is tempered at 900°F to achieve the desired hardness. The deep freeze processes above produce precipitation hardening.

In U. S. Pat. No. 3,131,097 issued to Mantel, a through hardening type of steel such as AISI 52100 is employed. This steel is initially heated to a temperature of 1,800°F and then quenched to a temperature of approximately 100°F. Thereafter the steel is reheated to approximately 1,350°F, again quenched to 100°F and subjected to a deep freeze at approximately −100°F. The material is then tempered at a temperature between 450° and 500°F.

The use of a carburizing grade of steel (that is, a steel capable of being carburized, or case hardened) for bearing races is described in U. S. Pat. No. 1,517,392 reissued to Becket. Although this reference contemplates the use of a carburizing steel, however, no additional special processing steps are described.

Stainless steels, although they exhibit excellent qualities of corrosion resistance for use in hostile environments, do not exhibit sufficient hardness to be generally employed for heavy duty bearings, since they generally cannot be hardened to the desired degree necessary for the heavier load applications in which heavy duty bearings are employed.

Although the through hardening type steels may be hardened sufficiently to be satisfactory for heavy duty bearing applications, the through hardening type steels are susceptible to the propagation of fatigue crackling across the entire bearing race section thickness causing catastrophic failure of the bearing with subsequent stoppage of the machine involved.

SUMMARY OF THE INVENTION

The general purpose of the present invention is to provide a heavy duty bearing of extended life. To achieve this purpose, the inner race of the bearing, which is subjected to higher levels of stress than other portions of the bearing, is formed of a high quality grade of carburizing steel, which has been remelted in a vacuum in order to minimize non-metallic inclusions, internal defects and voids commonly present in all types of steels. After treatment in accordance with the present invention, the inner bearing race of carburized steel, in contrast to a race of stainless or through hardened steel, has a shallow zone of hard bearing material which provides an extended rolling contact fatigue life. Under this hardened zone, the remainder of the bearing is somewhat softer and more ductile which normally prevents catastrophic failure of the bearing, although the outer hard layer is susceptible to shelling off.

In the manufacture of the bearing of the present invention the inner race, which is formed of a carburizing grade of steel, is subjected to a heat treatment process which produces residual compressive stresses in the bearing member. These residual compressive stresses act to offset or reduce the high tensile stress caused by the load on the bearing and results in a significant reduction of stresses on the bearing race under load. After heat treatment, the carburized steel inner bearing race is further subjected to a deep freeze process during which the crystalline structure formed during heat treatment, commonly known as retained austenite, is transformed into a structure called martensite. Martensite exhibits a high hardness and extreme brittleness. To eliminate the undesirable brittleness the steel bearing race is then tempered to produce the necessary ductility by a slight softening. The higher the tempering temperature employed, usually between 300° and 450°F, the softer the race material becomes. Thus, a bearing race of a material containing a minimum number of inclusions and having a hard but not brittle outer surface and a softer core that is not subject to catastrophic failure has been produced.

Another feature of the present invention is that during the tempering of the race material a hardness differential is maintained between the rollers and the inner and outer races in order to produce optimum rolling contact fatigue life.

After grinding and lapping of the race surfaces and rollers, a process of stress relieving is employed to eliminate the possibility of surface damage and to effect relief of surface stresses which may have been produced by the finishing operations. During this stress relieving operation, a black oxide coating is applied to the surface of the races to protect the surfaces during initial mating and operation of the bearing. The characteristics of the basic bearing material and processes are substantially enhanced by the features of maintaining a differential hardness between the races and rollers, stress relieving the finished races and adding a black oxide coating. These characteristics are ideally suited for prolonging the life of heavy duty bearings.

BRIEF DESCRIPTION OF THE DRAWINGS

FIG. 1 is a cross-section of the bearing of the present invention, having portions broken away.

FIG. 2 is a graph illustrating the processes employed on the inner bearing race.

DESCRIPTION OF THE PREFERRED EMBODIMENT

The present invention will be described with reference to a spherical roller bearing 10, however it is to be noted that the invention may be equally well utilized with respect to other anti-friction bearings such as ball bearings and roller bearings. The bearing comprises an outer race 12 having an interior spherical roller engaging surface 14 and an inner race 16. The inner race 16 has a central bore 18 adapted to receive a shaft (not shown) and further includes a pair of outwardly inclined annular curved and partially recessed roller engaging surfaces 20 and 22. These roller engaging surfaces are bounded on their outer edges by upstanding wall portions 24 and 26 which provide surfaces for locating or dismounting the bearing from a shaft. The roller engaging surfaces 20 and 22 receives multiple rollers 28 and are separated by a flat surface 30. Each of the bearing cages 32 and 34 comprises an annular ring portion 36 and multiple retainer portions 38 extending between the multiple rollers 28 to insure uniform spacing and retention of the rollers.

OUTER RING AND ROLLER MATERIAL

Preferably the outer ring and roller material to be used is of the through hardening type of steel such as AISI 52100 having the following composition:

| C | Mn | Si | P | S | Cr |
|---|---|---|---|---|---|
| .98–1.10 | .25–.45 | .20–.35 | .025 max. | .025 max. | 1.30–1.60 |

All figures are percentage by weight with the balance iron. The outer race 12 is tempered at a temperature of 375°–450° F. to obtain a hardness of 59–61 on the Rockwell Scale (C) while the rolling elements 28 are tempered at a somewhat lower temperature of 325°–375°F. to obtain a Rockwell "C" hardness of 60–62.

For applications involving high impact loading, the outer races 12 are preferably made from a carburizing grade of steel, such as will be described subsequently with respect to the inner race, to prevent catastrophic failure.

INNER RACE MATERIAL

A basic requirement for bearing materials and in particular the material used for the inner race is the ability to be formed with a surface of high hardness. The high hardness provides the load carrying ability required to withstand high contact stress between the rolling elements and the raceways experienced in bearing operation. Such stresses would easily deform ultra-high strength steel alloys such as those used for jet age applications. The high hardness resists deformation and compression where the ultra-high strength material resists the cracking and bending common to materials used in tension.

In addition, the very high hardness provides the wear resistance necessary to withstand the ofttimes astronomical number of revolutions of repeated stress cycles that are required for long bearing life. Although the very hard bearing steel can withstand these repeated stresses, any defects in the material such as non-metallic inclusions or small voids accelerate the failure rate. Cracks originate at the defects and lead to spalling of the bearing surface. The process of crack initiation, propagation and eventual spalling that results in bearing failures, is commonly called bearing fatigue or rolling contact fatigue.

Under repeated stress cycles, through hardened steels are susceptible to the propagation of fatigue cracking across the entire section thickness of the races causing catastrophic failure of the bearing with subsequent immobilization of the machine involved. The present invention contemplates the use of a uniquely treated carburizing grade of steel for the inner race material. In general, although carburized steel with its shallow zone of hard bearing material is more susceptible to shelling off of the hard layer, the softer core of material under the carburized case normally prevents catastrophic failures.

An advantage of a case hardened, or carburized material is the presence of compressed surface stresses in carburized steel due to the hard case and the soft core. The magnitude of such stress is determined by the quality of the carburized case and subsequent heat treatment. These residual compressive stresses act to offset or reduce the high tensile stress caused by the load on the bearing. The significance of a reduction in stress is realized with the knowledge that roller bearing life is significantly increased when the load is reduced.

In order to further enhance the inner bearing race rolling contact fatigue life, the carburizing steel to be used is remelted in a vacuum furnace to remove impurities that weaken the material and cause early bearing failures. The vacuum remelting process, known as CEVM (Consumable Electrode Vacuum Melting) boils off dissolved gases and greatly reduces the formation of complex non-metallic inclusions found in conventional vacuum deoxidized bearing quality steels.

The following steels are preferably used for forming the inner race of the extended life bearing.

CEVM 9310
| Carbon | Manganese | Nickel | Chromium | Molybdenum |
|---|---|---|---|---|
| .10 | .50 | 3.25 | 1.25 | .10 |

CEVM 3310
| Carbon | Manganese | Nickel | Chromium | Molybdenum |
|---|---|---|---|---|
| .10 | .50 | 3.50 | 1.50 | |

CEVM Krupp
| Carbon | Manganese | Nickel | Chromium | Molybdenum |
|---|---|---|---|---|
| .10 | .50 | 4.00 | 1.50 | |

The slightly reduced chromium level improves strength and ductility in carburized CEVM 9310, and the slightly increased nickel in CEVM 3310 acts similarly. The molybdenum is used to improve the hardenability of the 9310 alloy. The higher total alloy in 3310 and Krupp steel is useful for hardening of heavier sized race sections.

The heat treating processes to which the above mentioned inner race bearing materials are subjected after machining into the previously described inner race configuration, will be explained with reference to FIG. 2.

The first process to which the inner race 16 is subjected is a case carburizing process to transform the race of carburizing steel into a carburized steel race. The inner race is placed in a carburizing furnace and preferably heated to a temperature of 1,700°F as indicated in FIG. 2. Although this is the preferred temperature, temperatures in the range of 1,650° to 1,800°F may be employed. Further, propane gas or a high carbon fluid, such as is well known in the art for employment with carburizing processes, is injected into the furnace to create an atmosphere therein containing approximately 1.0 percent carbon. The inner races are maintained in this atmosphere at the carburizing temperature for a period from 10 to 20 hours depending on the depth of the case hardening desired and further upon the size or cross section of the race itself. After the desired time period in the carburizing furnace has been attained, the inner race may either be slowly cooled to room temperature or may be quenched to room temperature, either method being satisfactory.

The inner races are then heated in a furnace to a red heat temperature in the austenitizing zone above the temperature of 1,335°. Preferably the austenitizing temperature to be employed is 1,525°, while a satisfactory range is obtained from 1,425° to 1,550°F. The inner races are maintained at the austenitizing temperature range for approximately 1 minute to 60 minutes after through heating of the material is obtained. The races may be maintained at the austenitizing temperature indefinitely without adverse effect, however, cost increases with no further benefit being achieved.

After heating to the austenitizing range, the races are then quenched in oil to approximately room temperature. Thereafter, they are subjected to a deep freeze process which lowers the race temperatures to approximately −120°F as shown in FIG. 2. The deep freeze temperature range to which the races are lowered may be in the range of −100° to −346°F while the duration of the deep freeze process is of approximately 1 to 60 minutes or longer. A longer deep freeze holding time produces no additional material effect or benefit. The inner race is subjected to this deep freeze process in order to achieve a dimensional stabilization for the prevention of significant subsequent growth or shrinkage of the race at high bearing operating temperatures.

During the period in which the races are in the deep freeze, it is desirable that no part of the bearing surface contacts a cold surface in the deep freeze. Furthermore, a circulating fan should be employed within the freezing compartment to prevent a zoning of the temperature. After completion of the required time period in the deep freeze compartment, the races are warmed to room temperature before proceeding with the tempering process.

During the heating in the austenitizing range at 1,500°F, the steel has a crystalline structure called austenite in which carbon is quite soluble. During the quench from the high temperature, the austenite transforms in a matter of seconds to a new type of crystalline structure called martensite in which carbon is practically insoluble. This rapid change from austenite results in a trapping of carbon atoms in the distended atomic arrangement of martensite that causes high hardness and extreme brittleness. This extreme brittleness requires a tempering operation to produce the necessary ductility by a slight softening, resulting from the rearrangement of carbon atoms. The higher the tempering temperature, between 300° and 500°F, the softer the material becomes.

During the quenching and tempering of high carbon alloy steels, especially those containing nickel, all of the austenite does not transform to martensite. When significant austenite is retained in the bearing races after tempering, the inner race is said to contain retained austenite and is not stable with regard to changes in dimension during operation when exposed to elevated temperatures. This change, due to temperature, is normally a growth such that a bearing pressed on a shaft can become loose from a shaft during operation. Retained austenite is normally reduced to safe levels in medium duty bearings by using a higher tempering temperature. In the heavy duty extended life bearing of the present invention the retained austenite is reduced to safe levels by the use of the previously described deep freeze treatment for tempering. The deep freeze treatment previously described results in a more dimensionally stable bearing part when the bearing is exposed to elevated temperatures. The deep freeze treated bearing part has a higher hardness and a more uniform micro structure than a heat stabilized part which is stabilized by the use of a higher tempering temperature.

In order to further reduce bearing failure and to maintain an optimum rolling contact fatigue life, the tempering process is controlled to maintain a differential hardness between the rolling elements 28 and the inner and outer races 16 and 12. Referring again to FIG. 2, the inner race is heated to a tempering temperature of approximately 425°F and then cooled back to room temperature as shown in FIG. 2. The tempering temperature range for the inner and outer races may vary between 375° and 450°F to obtain a hardness of 59 to 61 on the Rockwell Scale C. On the other hand, the rolling elements are tempered at a somewhat lower temperature in the range of 325° to 375°F to obtain a hardness of Rockwell C scale in the range of 60 to 62.

After completion of the tempering operation the outer and inner races 12 and 16 as well as the rolling elements 28 are given a final surface finish. The fineness of the surface finish preferred for the rollers of the present bearing is in the order of 2–4 micro inches arithmetical average while the inner and outer races are finished to a fineness of 6 micro inches arithmetical average maximum. Furthermore, the roundness of the rolling elements for the bearings should be maintained within 1/50th of a millionth of an inch while the roundness of the surfaces 20 and 22 on the inner race should be within an average of 0.0005 inches T.I.R. (total indicator reading). These surface finishes are produced by grinding the components and then subjecting them to a lapping process. Because such surface finishing is done at high speed with the use of extremely hard abrasive materials, the possibility of surface damage always exists. As insurance against producing residual tensile stresses on the surface of the part during grinding operations, the inner ring 16 is given a stress relieving treatment illustrated on the graph of FIG. 2.

This treatment comprises of heating the race to approximately 300°F after the surface finishing operations are completed and then slow cooling the race back to room temperature.

Recognizing that the increase of industrial loads and speeds make bearing surfaces more critical to the life of the bearing, an additional surface treatment is provided for the inner ring of the extended life bearing in addition to the fine surface finish and stress relief treatment. A black oxide coating is applied to the surface of the inner ring by treatment in a hot caustic nitrate bath. The black oxide coating is a very thin porous oil retaining film which protects the surfaces in contact during the initial mating of the part surfaces at the start of bearing operation by reducing metal to metal contact at surface asperities that are present in all bearing surfaces. The use of a hot caustic-nitrate bath for producing a black oxide coating is well known in the art as evidenced by published references such as Houghto-Black 100, application data bulletin No. 2–168 by E.F. Houghton and Company and SAE specification AMS 2485C,1958 entitled Black Oxide Treatment. The black oxide coating may be produced by a process step after stress relieving. Preferably, however, the black oxide coating may be applied during the stress relieving process by performing the stress relieving in a hot caustic nitrate bath.

Although the best mode contemplated for carrying out the present invention has been herein shown and described, it will be apparent that modification and variation may be made without departing from what is regarded to be the subject matter of the invention.

What I claim is:

1. An extended life bearing comprising an outer race, multiple rollers, a cage for retaining said rollers, wherein the improvement comprises an inner race formed of a case hardening or carburizing alloy steel which has been vacuum remelted, said inner race having been carburized, said inner race having thereafter been heated into the austenitizing temperature range and oil quenched to room temperature, said inner race then subjected to deep freezing at a temperature below −100°F. and then tempered at a temperature between 300° and 500°F., said inner race ground to final dimensions and then stress relieved at a temperature between 275° and 450°F.

2. The bearing of claim 1 wherein said case hardening alloy steel is CEVM 9310.

3. The bearing of claim 1 wherein said case hardening alloy steel is CEVM 3310.

4. The bearing of claim 1 wherein said case hardening alloy steel is CEVM Krupp.

5. The bearing of claim 1 wherein said outer race is formed of AISI 52100.

6. The bearing of claim 1 wherein said outer race is of the same material as the inner race.

7. The bearing of claim 1 wherein a differential hardness of 1 to 2 points on the Rockwell "C" hardness scale is maintained between the rollers and the inner and outer races.

8. A method of producing an anti-friction bearing having an inner race, an outer race, and multiple rollers comprising the steps of forming the inner race of a carburizing grade of steel that has been vacuum remelted, carburizing said inner race, heating said inner race to an austenitizing temperature, quenching said inner race in oil to room temperature, deep freezing said inner race at a temperature below −100°F, tempering said inner race at a temperature between 300° and 500°F, finishing said inner race to final dimensions and stress relieving said inner race at a temperature between 275° and 450°F.

9. A method of treating the inner race of an anti-friction bearing made of a carburizing vacuum remelted steel comprising the steps of carburizing said inner race, heating said inner race to an austenitizing temperature, quenching said inner race in oil to room temperature, deep freezing said inner race at a temperature below −100°F, tempering said inner race at a temperature between 300° and 500°F, stress relieving said inner race at a temperature between 275° and 450°F, and applying a black oxide coating to said inner race.

10. The method of claim 8 wherein said stress relieving and black oxide application are performed simultaneously.

11. The method of claim 8 wherein a hardness differential of 1 to 2 points on the Rockwell Scale "C" is maintained between the rollers and the inner and outer races.

12. A method of treating the inner race of an anti-friction bearing made of a carburizing grade of steel comprising the steps of carburizing said inner race, heating said inner race to an austenitizing temperature, quenching said inner race in oil to room temperature, deep freezing said inner race at a temperature below −100°F, wherein the improvement comprises tempering said inner race at a temperature between 300° and 500°F, finishing said inner race to final dimensions, and stress relieving said inner race at a temperature between 275° and 450°F.

* * * * *